(12) United States Patent
Wang

(10) Patent No.: US 8,050,320 B2
(45) Date of Patent: Nov. 1, 2011

(54) STATISTICAL ADAPTIVE VIDEO RATE CONTROL

(75) Inventor: Zhicheng Lancelot Wang, Los Altos, CA (US)

(73) Assignee: Ericsson Television, Inc., Duluth, GA (US)

( * ) Notice: Subject to any disclaimer, the term of this patent is extended or adjusted under 35 U.S.C. 154(b) by 1301 days.

(21) Appl. No.: 11/704,826

(22) Filed: Feb. 9, 2007

(65) Prior Publication Data

US 2008/0192823 A1 Aug. 14, 2008

(51) Int. Cl.
*H04N 7/48* (2006.01)
*H04N 7/36* (2006.01)
*H04N 7/38* (2006.01)
*H04N 7/42* (2006.01)

(52) U.S. Cl. .......... 375/240.05; 375/240.03; 375/240.12

(58) Field of Classification Search ............. 375/240.03, 375/240.04, 240.05
See application file for complete search history.

(56) References Cited

U.S. PATENT DOCUMENTS

| | | | |
|---|---|---|---|
| 5,038,209 A | | 8/1991 | Hang |
| 6,088,392 A | * | 7/2000 | Rosenberg ............... 375/240.03 |
| 6,801,572 B2 | * | 10/2004 | Yamada et al. .......... 375/240.03 |
| 7,804,897 B1 | * | 9/2010 | Pun et al. ................. 375/240.04 |
| 2002/0085633 A1 | * | 7/2002 | Kim et al. ................. 375/240.03 |
| 2003/0202580 A1 | * | 10/2003 | Noh et al. ................. 375/240.03 |
| 2004/0213346 A1 | * | 10/2004 | Matsumura et al. ..... 375/240.03 |
| 2004/0264571 A1 | * | 12/2004 | Zhang et al. ............. 375/240.16 |
| 2005/0100090 A1 | * | 5/2005 | Kuo ........................ 375/240.03 |
| 2005/0175091 A1 | * | 8/2005 | Puri et al. ................. 375/240.03 |

OTHER PUBLICATIONS

Text of ISO/IEC 14496-2 Video Verification Model V.8.0. Joint Video Team (JVT) of ISO/IEC MPEG & ITU-T VCEG (ISO/IEC JTC1/SC29/WG11 and ITU-T SG16 Q6), No. N1796, Jul. 26, 1997.
Yu Sun et al. Synchronous and Asynchronous Multiple Object Rate Control for MPEG-4 Video Coding. Proceedings 2003 International Conference on Image Processing. ICIP-2003. Barcelona, Spain. Sep. 14-17, 2003. IEEE US vol. 3: Sep. 14, 2003.

* cited by examiner

*Primary Examiner* — David Czekaj
*Assistant Examiner* — David N Werner

(57) ABSTRACT

A method and apparatus for video rate control for a video encoding system for encoding a video signal includes determining 12 a variance of pixel values over a time t of the video signal and calculating 13 a quantization parameter for the time t using the pixel variance and a number of output bits for the time t and a quantization parameter, pixel variance and a number of output bits used for an immediately previous time t−1.

24 Claims, 3 Drawing Sheets

STATISTICAL ADAPTIVE VIDEO RATE CONTROL

FIELD OF THE INVENTION

This invention relates to video rate control and in particular to statistical adaptive video rate control.

BACKGROUND OF THE INVENTION

A rate control methodology and architecture for implementation of that methodology are essential components of any video encoding scheme to ensure that a coding process meets bit rate and quality constraints placed upon the encoding scheme by an application. In particular, the methodology seeks to match an output bit rate by adapting coding parameters such that an appropriate number of bits are placed in a buffer memory used to assist in smoothing a variable demand of image statistics to match what is usually a required fixed output bit rate.

A compromise is usually required between image quality resulting from the coding process and the bit rate; an excessively low bit rate resulting in an undesirable reduction of image quality. The rate control methodology may achieve such a compromise by targeting optimal combinations of the coding parameters for a given application, where some parameters are appropriately defined by the operator of the equipment, whilst minimising the load on the hardware and software computing resources used to realise the process as a whole but more specifically the rate control mechanism. Furthermore, it is usual for an operator to set a required output bit rate and the operator may also condition the input video signal by, for example, filtering or down-sampling the signal to a lower resolution. It is also possible for a pre-processing stage to perform this filtering automatically, depending on some measure of how difficult the coding is, given the operator's choice of parameters such as bit rate. Once these parameters are set externally by the operator, the coding algorithm attempts to adjust other primary parameters to meet the set constraints and the coding algorithm matches the number of coded bits generated with the required output bit rate primarily by periodic monitoring of a state of fill of the smoothing buffer memory, the size of which is defined by the algorithm itself. If the fill state increases, the algorithm reduces the number of bits entered by increasing the degree of quantisation; conversely, if the state of fill reduces the degree of quantisation is reduced. This variation in the degree of quantisation is effected by means of a Quantisation Parameter Qp defined by the algorithm.

The realisation of the algorithm in practice may be achieved with optimum system efficiency, that is, minimal hardware and software resources consistent with achievement of the required performance standards. Management of the means whereby the value of Qp is determined, taking account of image behaviour over long or short periods of time, that is, the Rate Control, is not defined by the algorithm specification and, whereas means are provided to send a value of Qp frequently, its value should take account of the behaviour of the input image statistics over several time scales and should thereby avoid anomalies resulting from injudiciously simple rate control. One such anomaly for an over-simple rate control occurs where the value of Qp is determined over too short a period of time such that a top part of an active image is coded at a radically different Qp from a bottom part, with a result that undesirable differences in image quality of the top and bottom halves of the image are visible after decoding. To avoid this kind of difficulty some measure of longer term averaging for Qp is also necessary. There is therefore a requirement to provide an efficient and effective rate control that is also stable in operation and does not contravene the rules of a particular algorithm in use.

As a result of the need to have such an effective rate control methodology, several control levels operating over several periodicities such as macroblock, slice and picture are adopted which correspond directly to a detailed structural design of the chosen coding algorithm and which have direct relationships with an image structure. For example, the structure of an image is usually organised hierarchically according to a natural order of a sequence of moving images and individual picture elements or pixels that make up each separate picture of a video signal. Typically the most significant of these structural elements of the image are: picture, slice and macroblock each of which is also a defined element of H264 and other video coding schemes. A "picture" is one complete image from the television sequence; a picture is also known as a "frame". According to industry practice, each picture or frame may also be divided into two fields where the image is scanned using interlace.

SUMMARY OF THE INVENTION

According to a first aspect of the invention, there is provided a method of video rate control for a video encoding system for encoding a video signal comprising: determining a variance of pixel values over a time t of the video signal; and calculating a quantisation parameter for the time t using the pixel variance and a number of output bits over the time t and a quantisation parameter used for, and pixel variance and a number of output bits over, an immediately preceding time t−1.

Advantageously, the variance is a modified variance being a function of the calculated variance over the time t and a similarly modified variance over the immediately preceding time t−1.

Conveniently, the modified variance $V(t)$ is defined as: $V(t)=(1-\alpha)V_a(t)+\alpha V(t-1)$ where $V_a(t)$ is the calculated variance over a time t, $V(t-1)$ is the modified variance over an immediately preceding time t−1 and $\alpha$ is a constant such that $0<\alpha<1$.

Advantageously, the quantisation parameter over the time t is given by: $QP(t)=(1-\beta)\Delta qp+\beta QP(t-1)$ where: $\Delta qp=(\epsilon(V(t)-V(t-1))+R(t-1)V(t-1)-R(t)V(t))/\eta$ where $QP(t-1)$ is the quantisation parameter over an immediately preceding time t−1, $\beta$ is a constant such that $0>\beta>1$, $R(t)$ is the number of output bits over the time t, $R(t-1)$ is the number of output bits over the immediately preceding time t−1 and $\epsilon$ and $\eta$ are constants.

Alternatively, the quantisation parameter over the time t is given by: $QP(t)=(1-\beta)\Delta qp+\beta QP(t-1)$ where: $\Delta qp=(\epsilon(V(t)-V(t-1))+R(t-1)V(t-1)-R(t)V(t))/\eta$ where $QP(t-1)$ is the quantisation parameter over an immediately preceding time t−1, $\beta$ is a constant such that $0>\beta>1$, $R(t)$ is the number of output bits over the time t, $R(t-1)$ is the number of output bits over the immediately preceding time t−1 and:

$$\eta = \frac{R(t-1)-R(t)}{\frac{QP(t)}{V(t)}-\frac{QP(t-1)}{V(t-1)}}, \text{ and } \varepsilon = R(t) + \frac{R(t-1)-R(t)}{1-\frac{V(t)\cdot QP(t-1)}{V(t-1)\cdot QP(t)}}.$$

Advantageously, the quantisation parameter is further dependent on a current fill rate of an output buffer.

Conveniently, the quantisation parameter is increased if the rate exceeds an upper threshold corresponding to overfilling of the output buffer and decreased if the rate is below a lower threshold corresponding to underfilling of the output buffer.

Advantageously, the time t corresponds to one of a macroblock, a slice, a picture and a group of pictures.

Conveniently, the method further comprises calculating the quantisation parameter dependent on a current average value of a motion vector for the video signal.

Conveniently, the quantisation parameter is adapted by the equation: $QP_m = QP_s + \Delta QP$ where $\Delta QP = \phi(V_m - V_s)/V_s + \tau |MV|^2$ where $\phi$ and $\tau$ are parameters selected to provide a chosen degree of adaptation and $QP_m$ and $QP_s$ are values of the quantisation parameter for a current macroblock and current slice respectively and $V_m$ and $V_s$ are the variances of the current macroblock and current slice respectively and MV is an average of the N most recent values of the motion vector such that $$|MV|^2 = \frac{1}{N} \sum_{i=0}^{N-1} (x_i^2 + y_i^2),$$

where $x_i$ and $y_i$ are horizontal and vertical components respectively of the motion vector.

According to a second aspect of the invention, there is provided a video rate controller for a video encoding system for encoding a video signal comprising: means for determining a variance of pixel values over a time t of the video signal; and means for calculating a quantisation parameter for the time t using the pixel variance and a number of output bits over the time t and a quantisation parameter used for, and pixel variance and a number of output bits over an immediately preceding time t−1.

According to a third aspect of the invention, there is provided a computer readable medium embodying stored computer executable software code, the code being for a method of video rate control for a video encoding system for encoding a video signal comprising: determining a variance of pixel values over a time t of the video signal; and calculating a quantisation parameter for the time t using the pixel variance and a number of output bits over the time t and a quantisation parameter used for, and pixel variance and a number of output bits over, an immediately preceding time t−1.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

Embodiments of the present invention will now be described, by way of example only, with reference to the accompanying drawings, in which.

DETAILED DESCRIPTION OF PREFERRED EMBODIMENTS

Figure 1:
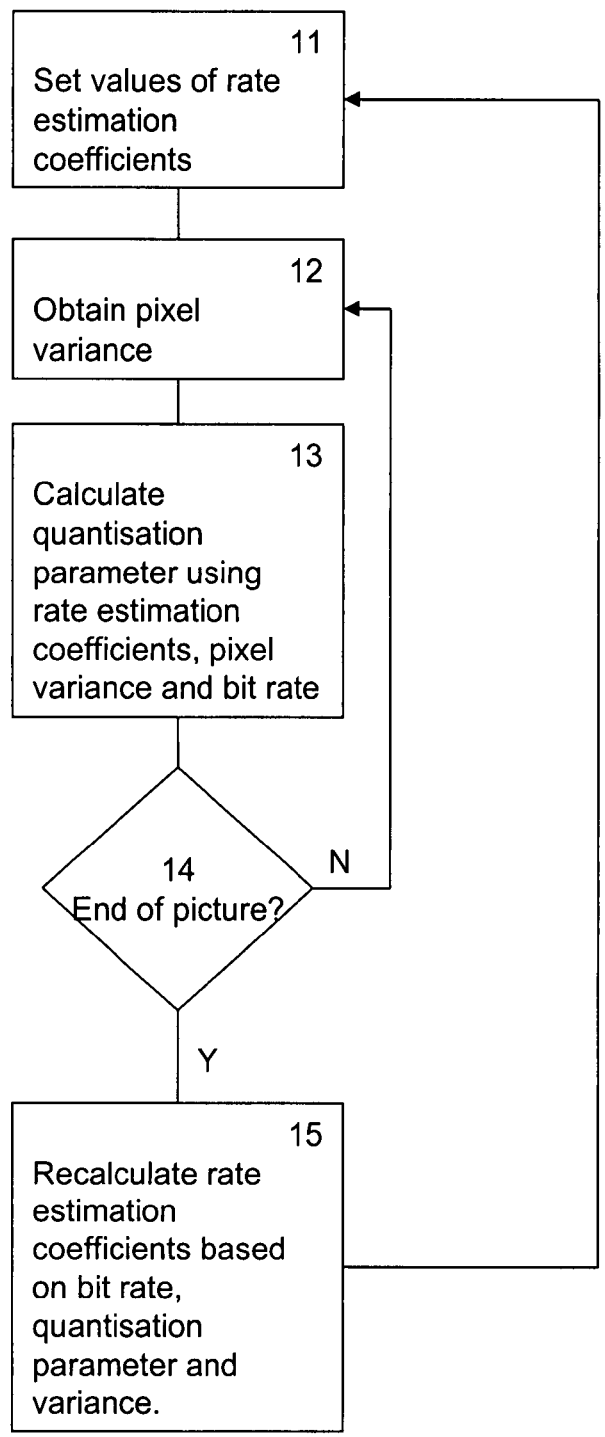
FIG. 1 is flowchart of a method of setting a value of a quantisation parameter according to the invention.

Throughout the description, identical reference numerals are used to identify like parts.

Video signals are complex, highly structured entities having rich features with significant statistical dynamics. This complexity requires that coding algorithms are also complex and, in order to be efficient, have to be multi-layered, matching the multi-layered nature of the images themselves. The following statistical features and information describing the images are used, among others, for coding control:

Temporal and spatial behaviour, in particular the predictability of pixel values in these dimensions,
Motion and its estimation and subsequent calculation of motion vectors,
Video scene changes, cuts and fades,
Signal mean, both long and short term,
Signal variance, both long and short term,
Signal autocorrelation, both long and short term, and
Signal cross-correlation, both long and short term.

The rate control process makes coding decisions and choices based on this information with self adaptive procedures. These statistical measures apply to large and small areas of each image in the spatial domain, that is, differently sized pixel assemblies such as MPEG/H264 blocks, macroblocks and slices, but can also apply to sequences of images in the time domain.

Quantisation Control

A rate control methodology according to the invention operates by matching a defined output rate to input image statistics, as expressed through the parameters listed above. This is typically achieved by assembling the spatial pixel values, or differences between successive values taken picture by picture, in defined arrays and transforming these values using an appropriate mathematical process such as the Discrete Cosine Transform [DCT]. This in itself does not reduce the bit rate but by judicious discarding and quantising of the coefficients of the transformed pixel values the amount of information to describe the image is substantially reduced. The quantisation process is informed and guided by knowledge of the statistics of the image. The present methodology introduces innovative processes with respect to statistical computing of the input, data prediction and the adaptation of quantisation levels based on the data statistics.

Rate Control Procedure and Formulas

The statistical variables used in this invention are macroblock-based. For simplicity, the variables can also be updated sequentially for macroblocks, slices, pictures and Groups of Pictures so that the resultant Qp value used every macroblock is a function of the variances taken over a variety of periodicities.

Thus the rate control procedure is described in the following steps which apply to complete pictures but it may also be used at other levels of the image structure, for example, slice and macroblock.

Step 1: Establish Video Input Source Statistics:

A current average value, $P_a$, of the pixels in each macroblock is calculated:

$$P_a = \Sigma P_{(I,J)} >> 8$$

where $P_{(I,J)}$ is a pixel value in the macroblock located at index I, J, i.e. at row I and column J of the macroblock array. A luminance value of each pixel is normally used to perform this calculation, however the chrominance values may also be taken into account. The operator ">>x" represents a shift of the binary point x places to the left with the result of dividing the value preceding the operator by $2^x$. Shifting by 8 places divides by 256, the number of pixels in a 16×16 macroblock.

Referring to FIG. 1, the variance of the macroblock pixels, $V_a$, is also calculated, step 12, as follows:

$$V_a = (\Sigma (P_{(I,J)} - P_a)^2) >> 8$$

and a modified variance is defined as:

$$V(t)=(1-\alpha)V_a(t)+\alpha V(t-1) \quad (1)$$

where α is a suitably chosen constant such that 0<α<1 and V(t) is the modified variance taken over an arbitrary period of time, t, conveniently chosen to coincide with a major structural feature of the image such as a picture or slice or even a Group of Pictures (GoP). Here, t refers to the current picture, slice or GoP and (t−1) refers to the corresponding previous picture, slice or GoP.

Step 2: Quantisation Step Size Estimation:

One of the major parameters of current video coding algorithms is the quantisation parameter, Qp. It may be defined for each picture or slice but its value is also constrained by a current fill state of the buffer memory in a known manner.

In calculating each new value of Qp according to an embodiment of this invention the following adaptation formula is used to determine a change in value of the quantisation parameter, or a differential quantisation, at each iteration, dependent on changes in variance and output bit rate:

$$\Delta qp = (\epsilon(V(t)-V(t-1))+R(t-1)V(t-1)-R(t)V(t))/\eta \quad (2)$$

where V(t) is the variance of the macroblock pixels as calculated above, R(t) is the current value of the average number of output bits per macroblock and $\epsilon$ and $\eta$ are rate estimation coefficients which are either constants or variables updated according to equations (4) and (5) below.

In order to smooth changes in the variability of the quantisation parameter, the value for a current time period may then be determined, step 13, proportionately from a value at the preceding time period and the differential quantisation:

$$QP(t)=(1-\beta)\Delta qp+\beta QP(t-1). \quad (3)$$

where β is a constant such that 0<β<1 and is chosen to provide a predetermined degree of dependence on the preceding value and thereby provide smoothed transitions of the quantisation parameter value.

In addition, motion vector [MV] information may be used to contribute to the quantisation factor choice as follows:

$$QP_m = QP_s + \Delta QP \quad (6)$$

$$\text{where } \Delta QP = \phi(V_m - V_s)/V_s + \tau |MV|^2 \quad (7)$$

where $\phi$ and $\tau$ are chosen parameters and $QP_m$ and $QP_s$ are the values of the quantisation factor for a macroblock and slice and $V_m$ and $V_s$ are the variances of a macroblock and slice respectively. The parameter MV allows motion information to be taken into account through the value of the square of the modulus of the motion vector averaged over the last N values i.e.

$$|MV|^2 = \frac{1}{N}\sum_{i=0}^{N-1}(x_i^2 + y_i^2),.$$

The values $x_i$ and $y_i$ are the horizontal and vertical components of the motion vector.

The encoding transformation and quantisation are carried out using the derived quantisation parameter for the current time period.

The rate estimation coefficients may then be recalculated, step 15, based on the current rate, quantisation parameter and modified variance. The current value of the average number of output bits R(t) for the picture, slice or macroblock as appropriate is obtained in order to update the coefficients of rate estimation:

$$\eta = \frac{R(t-1)-R(t)}{\frac{QP(t)}{V(t)} - \frac{QP(t-1)}{V(t-1)}}, \quad (4)$$

and $$\varepsilon = R(t) + \frac{R(t-1)-R(t)}{1 - \frac{V(t)\cdot QP(t-1)}{V(t-1)\cdot QP(t)}} \quad (5)$$

The coefficients and parameters may be updated at a frequency of each picture, Group of Pictures etc. by determining, step 14, when an end of a time period, such as an end of a picture, is reached.

In this manner the bit rate can be maintained between upper and lower thresholds M and L respectively, to provide quantisation convergence update and output buffer update, where M and L are chosen based upon requirements of an application such as a required bit rate and an output buffer size.

Figure 2:
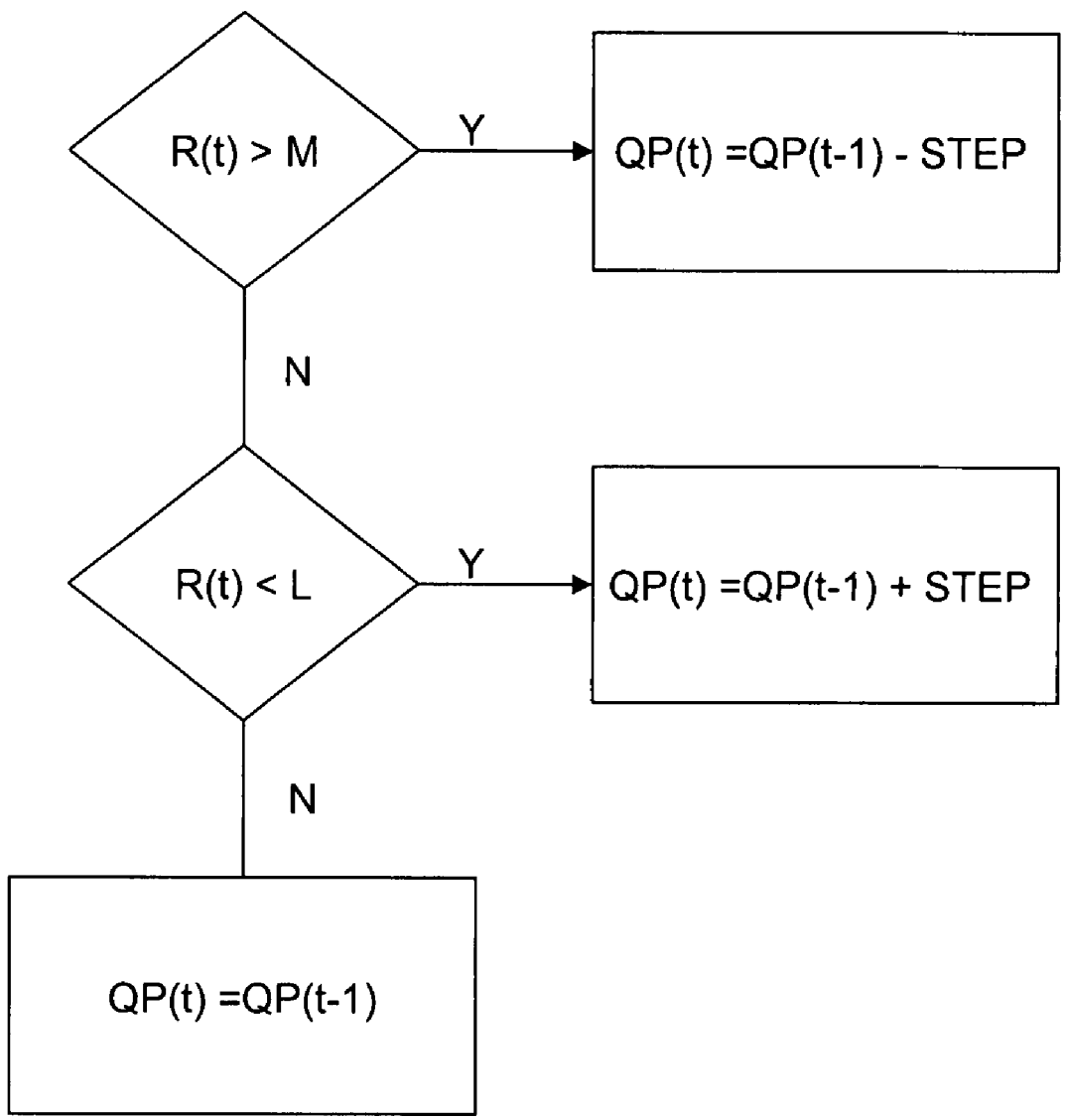
FIG. 2 is a flowchart of a method of adapting the value of the quantisation parameter to maintain a bit rate between upper and lower thresholds as used in the present invention.

As shown in FIG. 2, for a frame/field:

If R(t)>M, QP(t)=QP(t−1)−STEP;

Else if R(t)<L, QP(t)=QP(t−1)+STEP;

Else QP(t)=QP(t−1);

The thresholds themselves may be adjusted as follows:

if M>f1*Target then M=M*c1 and if L<f2*Target, then L=L*c2 where f1, f2, c1, c2, M and L are chosen constants as indicated above and f1>1, c1<1 f2<1 and c2>1 and Target is a preferred fill state of the output buffer.

The next frame (or sub-frame) may then be coded using the revised values.

This invention provides a rate control methodology, architecture and system for use in video encoding and transcoding. Although this rate control scheme is not restricted to H.264, the current procedure has the application target of optimal H.264 encoding.

The proposed rate control includes the optimization of bitstream rate, buffer modeling and management, speed, and resource allocation for video encoding and transcoding, at frame/field, slice and macroblock levels. This rate control method is a fast, single-pass method for optimal rate-distortion performance and it is based upon the context of the input video and the system processing and control of the rate control are organized as a predictive process. The rate control method can be used in both constant bit rate (CBR) and variable bit rate (VBR) applications, in statistical multiplexing and network bandwidth management algorithms.

The method improves the encoding performance and video quality with much less computational complexity than existing rate control methods realised on existing implementation platforms. Simulations and real implementations of the proposed rate control scheme have shown compression quality improvements of H.264 encoding in terms of subjective and objective measures. For example, about 2 dB PSNR improvement has been achieved over an existing rate control using sequences of an industry standard video test. The input and output buffer models are built with segment-wise adaptation for real-time bit allocation and encoding/transcoding procedures. Particularly, the output buffer occupancy of given resource and application requirements are used in the rate control with a predictive bit allocation and smoothing mechanism. Thus the output buffer occupancy for a given buffer size and bit rate is used by the rate control procedure. If the buffer occupancy, buffer size or bit rate change, the rate control will change accordingly.

Figure 3:
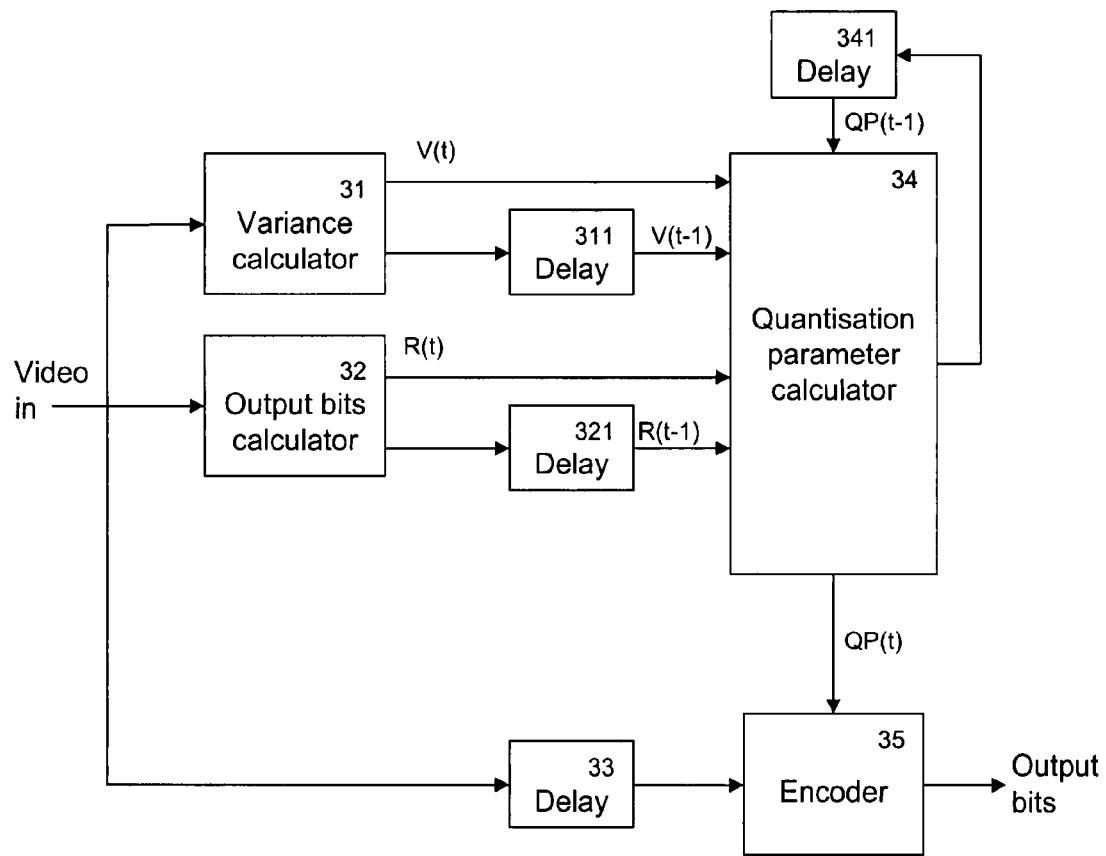
FIG. 3 is a schematic diagram of a video encoder with a video rate controller according to an aspect of the invention.

Referring to FIG. 3, in an apparatus according to the invention, a video signal to be encoded is input to a variance calculator 31 to calculate the pixel variance V(t) over a time t across, for example, a macroblock, slice or picture. The variance V(t) is output to a quantisation parameter calculator 34 and to a first delay 311. A variance V(t−1) for an immediately preceding time period t−1 is also output from the first delay 311 to the quantisation parameter calculator 34. The video signal is also input to an output bits calculator for calculating a bit rate R(t), e.g. a number of output bits per macroblock, to be output when the video signal is encoded over the time t, which is input to the quantisation parameter calculator 34. The bit rate is also output to a second delay 321 which outputs a bit rate R(t−1) for the immediately preceding time period t−1 to the quantisation parameter calculator 34. Finally, the video signal is also input via a third delay 33 to a video encoder 35.

The quantisation parameter calculator 34 outputs a value of a quantisation parameter to a fourth delay 341 which feeds back a value of the quantisation parameter QP(t−1) for the immediately preceding time period t−1 to the quantisation parameter calculator 34 which then calculates a quantisation parameter QP(t) for the current time period t based on the variance V(t) over the current time period t, the variance V(t−1) over an immediately preceding time period, the bit rate R(t) for the current time period t, the bit rate R(t−1) for the immediately preceding time period t−1 and the quantisation parameter QP(t−1) used for the immediately preceding time period. The quantisation parameter QP(t) is used for encoding the delayed video signal input to the encoder 35 corresponding to the time t.

The invention provides the following advantages:
- adaptively predicting the current quantisation level based on past quantisation level and past and current input data statistics;
- improved procedures described by formulae (2), (3), (4) (5) and (7) for quantisation adaptation and update;
- improved rate control adaptation procedure.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

Although the present invention has been described with reference to preferred embodiments, workers skilled in the art will recognize that changes may be made in form and detail without departing from the spirit and scope of the invention.

The invention claimed is:

1. A method of video rate control for a video encoding system for encoding a video signal comprising:
   a) determining, using a processor, a variance of pixel values over a time t of the video signal; and
   b) calculating, using a processor, a quantization parameter for the time t using the pixel variance and a number of output bits over the time t and a quantization parameter used for an immediately preceding time t−1, a pixel variance over the immediately preceding time t−1, and a number of output bits over the immediately preceding time t−1;

wherein the variance is a modified variance being a function of the calculated variance over the time t and a similarly modified variance over the immediately preceding time t−1, and wherein the modified variance V(t) is defined as: $V(t)=(1-\alpha)V_a(t)+\alpha V(t-1)$ where $V_a(t)$ is the calculated variance over a time t, $V(t-1)$ is the modified variance over the immediately preceding time t−1 and $\alpha$ is a constant such that $0<\alpha<1$.

2. A method as claimed in claim 1, wherein the quantization parameter over the time t is given by:

$$QP(t)=(1-\beta)\Delta qp+\beta QP(t-1)$$

where:

$$\Delta qp=(\epsilon(V(t)-V(t-1))+R(t-1)V(t-1)-R(t)V(t))/\eta$$

where QP(t−1) is the quantization parameter over an immediately preceding time t−1, $\beta$ is a constant such that $0>\beta>1$, R(t) is the number of output bits over the time t, R(t−1) is the number of output bits over the immediately preceding time t−1 and $\epsilon$ and $\eta$ are constants.

3. A method as claimed in claim 1, wherein the quantization parameter over the time t is given by:

$$QP(t)=(1-\beta)\Delta qp+\beta QP(t-1)$$

where:

$$\Delta qp=(\epsilon(V(t)-V(t-1))+R(t-1)V(t-1)-R(t)V(t))/\eta$$

where QP(t−1) is the quantization parameter over an immediately preceding time t−1, $\beta$ is a constant such that $0>\beta>1$, R(t) is the number of output bits over the time t, R(t−1) is the number of output bits over the immediately preceding time t−1 and:

$$\eta = \frac{R(t-1)-R(t)}{\frac{QP(t)}{V(t)}-\frac{QP(t-1)}{V(t-1)}}, \text{ and } \varepsilon = R(t)+\frac{R(t-1)-R(t)}{1-\frac{V(t)\cdot QP(t-1)}{V(t-1)\cdot QP(t)}}.$$

4. A method as claimed in claim 1, wherein the quantization parameter is further dependent on a current fill rate of an output buffer.

5. A method as claimed in claim 4, wherein the quantization parameter is increased if the rate exceeds an upper threshold corresponding to overfilling of the output buffer and decreased if the rate is below a lower threshold corresponding to underfilling of the output buffer.

6. A method as claimed in claim 1, wherein the time t corresponds to one of a macroblock, a slice, a picture and a group of pictures.

7. A method as claimed in claim 1, further comprising calculating the quantization parameter dependant on a current average value of a motion vector for the video signal.

8. A method as claimed in claim 7, wherein the quantization parameter is adapted by the equation: $QP_m=QP_s+\Delta QP$ where $\Delta QP=\phi(V_m-V_s)/V_s+\tau|MV|^2$ where $\phi$ and $\tau$ are parameters selected to provide a chosen degree of adaptation and $QP_m$ and $QP_s$ are values of the quantization parameter for a current macroblock and current slice respectively and $V_m$ and $V_s$ are the variances of the current macroblock and current slice respectively and MV is an average of the N most recent values of the motion vector such that $$|MV|^2 = \frac{1}{N}\sum_{i=0}^{N-1}(x_i^2 + y_i^2),$$

where $x_i$ and $y_i$ are horizontal and vertical components respectively of the motion vector.

9. A video rate controller for a video encoding system for encoding a video signal, the video rate controller comprising:
at least one processor;
a non-transitory, computer-readable storage medium, coupled to the at least one processor, wherein the non-transitory, computer-readable storage medium further comprises computer-readable instructions, when executed by the at least one processor, configured to:
determine a variance of pixel values over a time t of the video signal; and
calculate a quantization parameter for the time t using the pixel variance and a number of output bits over the time t and a quantization parameter used for an immediately preceding time t−1, a pixel variance over the immediately preceding time t−1, and a number of output bits over the immediately preceding time t−1, wherein
the variance is a modified variance being a function of the calculated variance over the time t and a similarly modified variance over the immediately preceding time t−1, and
wherein the modified variance V(t) is defined as: V(t)=(1−α)V$_a$(t)+αV(t−1) where V$_a$(t) is the calculated variance over a time t, V(t−1) is the modified variance over the immediately preceding time t−1 and α is a constant such that 0<α<1.

10. A video rate controller as claimed in claim 9, wherein the quantization parameter over the time t is given by:

$QP(t)=(1-\beta)\Delta qp+\beta QP(t-1)$ where:

$\Delta qp=(\epsilon(V(t)-V(t-1))+R(t-1)V(t-1)-R(t)V(t))/\eta$ where QP(t−1) is the quantization parameter over an immediately preceding time t−1, β is a constant such that 0>β>1, R(t) is a number of output bits over the time t, R(t−1) is a number of output bits over the immediately preceding time t−1 and $\epsilon$ and $\eta$ are constants.

11. A video rate controller as claimed in claim 9, wherein the quantization parameter over the time t is given by:

$QP(t)=(1-\beta)\Delta qp+\beta QP(t-1)$ where:

$\Delta qp=(\epsilon(V(t)-V(t-1))+R(t-1)V(t-1)-R(t)V(t))/\eta$ where QP(t−1) is the quantization parameter over an immediately preceding time t−1, β is a constant such that 0>β>1, R(t) is a number of output bits over the time t, R(t−1) is a number of output bits over the immediately preceding time t−1, where:

$$\eta = \frac{R(t-1)-R(t)}{\frac{QP(t)}{V(t)}-\frac{QP(t-1)}{V(t-1)}}, \text{ and } \varepsilon = R(t) + \frac{R(t-1)-R(t)}{1-\frac{V(t)\cdot QP(t-1)}{V(t-1)\cdot QP(t)}}.$$

12. A video rate controller as claimed in claim 9, wherein the quantization parameter is further dependent on a current fill rate of an output buffer.

13. A video rate controller as claimed in claim 12, wherein the quantization parameter is increased if the rate exceeds an upper threshold corresponding to overfilling of the output buffer and decreased if the rate is below a lower threshold corresponding to underfilling of the output buffer.

14. A video rate controller as claimed in claim 9, wherein the time t corresponds to one of a macroblock, a slice, a picture and a group of pictures.

15. A video rate controller as claimed in claim 9, further arranged to calculate the quantization parameter dependant on a current average value of a motion vector for the video signal.

16. A video rate controller as claimed in claim 15, wherein the quantization parameter is adapted by the equation: $QP_m=QP_s+\Delta QP$ where $\Delta QP=\phi(V_m-V_s)/V_s+\tau|MV|^2$ where $\phi$ and $\tau$ are parameters selected for a chosen degree of adaptation and $QP_m$ and $QP_s$ are values of the uantization parameter for a current macroblock and current slice respectively and $V_m$ and $V_s$ are the variances of the current macroblock and current slice respectively and MV is an average of the N most recent values of the motion vector such that $$|MV|^2 = \frac{1}{N}\sum_{i=0}^{N-1}(x_i^2 + y_i^2),$$

where $x_i$ and $y_i$ are horizontal and vertical components respectively of the motion vector.

17. A non-transitory computer readable medium embodying stored computer executable software code, when executed by a processor, the computer executable software code is configured to:
determine a variance of pixel values over a time t of the video signal; and
calculate a quantization parameter for the time t using the pixel variance and a number of output bits over the time t and a quantization parameter used for an immediately preceding time t−1, a pixel variance over the immediately preceding time t−1, and a number of output bits over the immediately preceding time t−1, wherein
the variance is a modified variance being a function of the calculated variance over the time t and a similarly modified variance over the immediately preceding time t−1, and
wherein the modified variance V(t) is defined as: V(t)=(1−α)V$_a$(t)+αV(t−1) where V$_a$(t) is the calculated variance over a time t, V(t−1) is the modified variance over the immediately preceding time t−1 and a is a constant such that 0<α<1.

18. A computer readable medium as claimed in claim 17, wherein the quantization parameter over the time t is given by:

$QP(t)=(1-\beta)\Delta qp+\beta QP(t-1)$ where:

$\Delta qp=(\epsilon(V(t)-V(t-1))+R(t-1)V(t-1)-R(t)V(t))/\eta$ where QP(t−1) is the quantization parameter used for an immediately preceding time t−1, β is a constant such that 0<β<1, R(t) is the number of output bits over the time t, R(t−1) is the number of output bits over the immediately preceding time t−1 and $\epsilon$ and $\eta$ are constants.

19. A computer readable medium as claimed in claim 17, wherein the quantization parameter over the time t is given by:

$$QP(t)=(1-\beta)\Delta qp+\beta QP(t-1)$$

where:

$$\Delta qp=(\epsilon(V(t)-V(t-1))+R(t-1)V(t-1)-R(t)V(t))/\eta$$

where QP(t−1) is the quantization parameter used for an immediately preceding time t−1, β is a constant such that 0<β<1, R(t) is the number of output bits over the time t, R(t−1) is the number of output bits over the immediately preceding time t−1, where:

$$\eta = \frac{R(t-1)-R(t)}{\frac{QP(t)}{V(t)} - \frac{QP(t-1)}{V(t-1)}}, \text{ and } \varepsilon = R(t) + \frac{R(t-1)-R(t)}{1 - \frac{V(t) \cdot QP(t-1)}{V(t-1) \cdot QP(t)}}.$$

20. A computer readable medium as claimed in claim 17, wherein the quantization parameter is further dependent on a current fill rate of an output buffer.

21. A computer readable medium as claimed in claim 20, wherein the quantization parameter is increased if the rate exceeds an upper threshold corresponding to overfilling of the output buffer and decreased if the rate is below a lower threshold corresponding to underfilling of the output buffer.

22. A computer readable medium as claimed in claim 17, wherein the time t corresponds to one of a macroblock, a slice, a picture and a group of pictures.

23. A computer readable medium as claimed in claim 17, for further calculating the quantization parameter dependant on a current average value of a motion vector for the video signal.

24. A computer readable medium as claimed in claim 23, wherein the quantization parameter is adapted by the equation: $QP_m=QP_s+\Delta QP$ where $\Delta QP=\phi(V_m-V_s)/V_s+\tau|MV|^2$ where φ and τ are parameters selected for a chosen degree of adaptation and $QP_m$ and $QP_s$ are values of the quantization parameter for a current macroblock and current slice respectively and $V_m$ and $V_s$ are the variances of the current macroblock and current slice respectively and MV is an average of the N most recent values of the motion vector such that $$|MV|^2 = \frac{1}{N}\sum_{i=0}^{N-1}(x_i^2+y_i^2),$$

where $x_i$ and $y_i$ are horizontal and vertical components respectively of the motion vector.

* * * * *

UNITED STATES PATENT AND TRADEMARK OFFICE
CERTIFICATE OF CORRECTION

| | | |
|---|---|---|
| PATENT NO. | : 8,050,320 B2 | |
| APPLICATION NO. | : 11/704826 | |
| DATED | : November 1, 2011 | |
| INVENTOR(S) | : Wang | |

It is certified that error appears in the above-identified patent and that said Letters Patent is hereby corrected as shown below:

In Column 10, Line 20, in Claim 16, delete "uantization" and insert -- quantization --, therefor.

In Column 10, Line 52, in Claim 17, delete "a is a" and insert -- α is a --, therefor.

Signed and Sealed this
Twenty-first Day of February, 2012

David J. Kappos
*Director of the United States Patent and Trademark Office*